Nov. 16, 1954
C. E. STARR, JR., ET AL
2,694,674
ACTIVATION OF SODIUM CONTAMINATED
SYNTHETIC SILICA-ALUMINA CATALYST
WITH HYDROGEN FLUORIDE
Filed Feb. 7, 1951
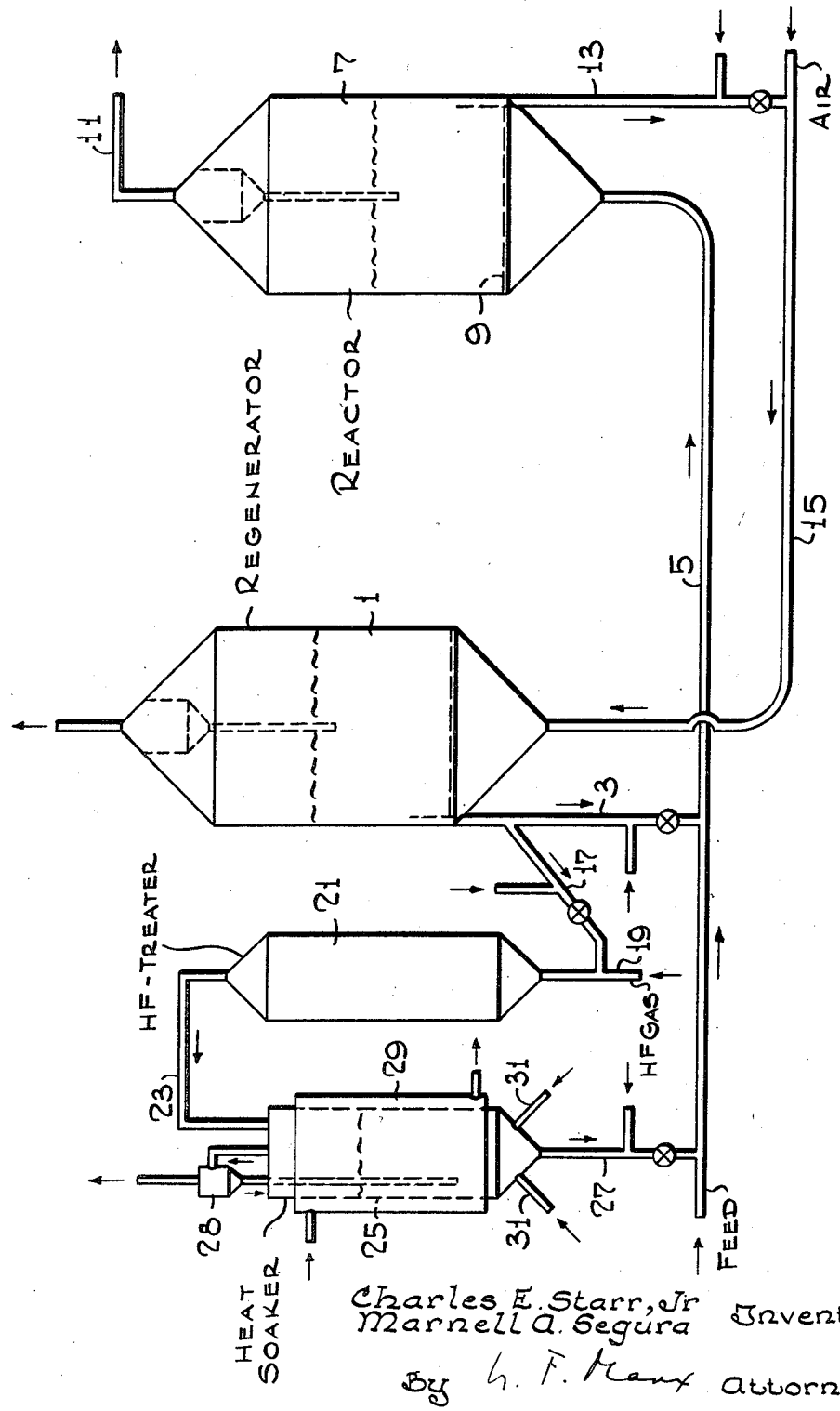
Charles E. Starr, Jr
Marnell A. Segura  Inventors
By L. F. Kemp  Attorney

United States Patent Office 2,694,674
Patented Nov. 16, 1954

2,694,674

ACTIVATION OF SODIUM CONTAMINATED SYNTHETIC SILICA-ALUMINA CATALYST WITH HYDROGEN FLUORIDE

Charles E. Starr, Jr., and Marnell A. Segura, Baton Rouge, La., assignors to Standard Oil Development Company, a corporation of Delaware Application February 7, 1951, Serial No. 209,820

2 Claims. (Cl. 196—52)

The present invention relates to the activation of catalysts used in catalytic hydrocarbon conversions involving hydrocarbon cracking. More particularly, the invention pertains to a process for reactivating catalysts which are subject to contamination and deactivation by the deposition of contaminants and which undergo repeated regeneration treatments by an oxidative removal of carbonaceous deposits at relatively high temperatures, in the course of the catalytic conversion process whereby the catalysts suffer a substantial and permanent loss in activity and selectivity toward the formation of desirable reaction products. This reactivation is accomplished by incorporating hydrogen fluoride into the deactivated catalyst and heat-soaking the catalyst so treated, as will appear from the description hereinafter read with reference to the accompanying drawing.

In conventional processes for the catalytic conversion or cracking of hydrocarbon oils, a normally liquid feed stock, such as gas oil, reduced crude, whole crude, etc., is vaporized and contacted in the vapor state with a cracking catalyst at temperatures of about 800°–1100° F. and contact times adequate for the desired conversion. Catalysts, such as activated clays including acid treated bentonite, synthetic composite gel type catalysts, such as silica-alumina, silica-alumina-magnesia composites with or without the addition of activating ingredients, such as boria, chromia, zirconia, etc. have been used in fixed bed, moving bed, fluid or suspensoid type operations.

In the course of the cracking reaction, coke-like carbonaceous materials are deposited on the catalyst whereby its activity is greatly impaired. The carbonized catalyst is, therefore, regenerated by burning off the carbonaceous deposits with air or other regenerating gases at temperatures of about 800°–1100° F., but not exceeding about 1200° F. in order to avoid permanent deactivation of the catalyst by overheating. When the catalyst is so regenerated continuously or at frequent intervals, its activity remains sufficiently high for a certain length of time.

However, after a prolonged use involving a large number of reaction and regeneration cycles, the catalyst exhibits an appreciable drop in activity and, in addition, a very substantial loss in its selectivity toward desired cracking products, particularly toward gasoline range hydrocarbons. Activity and selectively lost in this manner cannot be restored by the combustion type of regeneration referred to above. Various definitions and standard tests have been employed to determine the relative activity and selectivity of fresh or used cracking catalysts. In the present specification, the well established activity and selectivity standards of "Distillate+Loss" ($D+L$), "Carbon Producing Factor" (CPF), and/or "Gas Producing Factor" (GPF) will be relied on. The $D+L$ of a catalyst is determined by a standard test fully described in the literature (Conn and Connolly, Ind. Eng. Chem. vol. 39, page 1138 (1947)). Briefly, a standard feed stock is cracked on the test catalyst at standard conditions and 100 cc. of the liquid product is distilled in standard equipment. The amount of gasoline distilled at 400° F. is designated as "Distillate" or D, the residue is R and the value $100-(D+R)$ is called loss or L. The sum of $D+L$ is a criterion for activity and selectivity and may vary from about 10–20 for deactivated catalysts to about 25–50 for reactivated or fresh cracking catalysts. The "Carbon Producing Factor" (CPF) is the ratio of the carbon produced by the test catalyst to that produced by an uncontaminated catalyst adjusted to the same activity by steam or heat treatment. It ranges from 1.0 for fresh catalyst to 1.5–2.0 or more for used catalyst. The ratio of dry gas (cu. ft. per barrel of oil) produced by the test catalyst to the dry gas produced by uncontaminated catalyst of the same activity is the "Gas Producing Factor" (GPF). Both CPF and GPF may be used to measure catalyst selectivity. The lower these factors, the better is the indicated catalyst selectivity.

Prior to the present invention, it has been suggested to reactivate cracking catalysts deactivated by a prolonged use in catalytic cracking operations involving cracking and regeneration cycles, by treating the deactivated catalyst with various fluoriding materials, such as anhydrous or aqueous HF, hydrocarbon vapors containing organic fluorides, etc., capable of incorporating small amounts of HF, say about 0.1–5 wt. percent into the catalyst. Also fresh alumina catalysts containing minor proportions of silica have been prepared by treating the catalyst composites with various fluoriding agents, such as HF, $BF_3$, etc., particularly in the presence of phosphoric acid, drying and heating the product overnight at about 1000° F. While procedures of this kind generally have afforded substantial improvements in catalyst activity, their effect on selectivity has been less pronounced. The present invention overcomes this disadvantage.

It is, therefore, the principal object of the present invention to provide an improved method for reactivating hydrocarbon conversion catalysts.

A more specific object of the invention is to provide an improved process for reactivating cracking catalysts which have been deactivated in processes involving frequent regeneration of the carbonized catalyst.

Other objects and advantages will appear from the subsequent description of the invention.

It has now been found that the activity and particularly the selectivity toward desirable products of hydrocarbon conversion catalysts reactivated after prolonged use of, say, at least about 50 hours by a treatment with hydrogen fluoride may be further substantially increased by subjecting the HF-treated catalysts to a heat-soaking treatment at temperatures of about 800°–1200° F., preferably 1050°–1150° F., for an extended period of time not less than 24 hours up to about 2–7 days. The heat treatment must be carried out in the absence of steam in order to avoid excessive losses of HF. Best results are obtained when any contact between the catalyst and the atmosphere surrounding the soaking zone is prevented during the soaking period, i. e. the soaking treatment should be carried out in a closed vessel connected with the atmosphere merely by a pinhole vent. The beneficial influence of the heat-soaking treatment of the invention is so pronounced that excellent catalyst activity and selectivity may be obtained at HF concentrations of the catalyst substantially below 5 wt. percent, particularly at about 0.1–1 wt. percent, so that the required amount of HF may be incorporated without an appreciable removal of catalytic metal oxides from the catalyst.

While the invention affords certain improvements of hydrocarbon conversion catalysts quite generally, best results with respect to selectivity are consistently obtained when the invention is applied to cracking catalysts of the synthetic composite gel type comprising silica gel associated with minor proportions of alumina. Catalysts of this type and processes for their preparation are so well known in the cracking art that a detailed description thereof is believed to be unnecessary. The most commonly used representative of this group of catalysts is a composite containing about 85–88% of silica gel and about 12–15%, preferably about 13%, of alumina and this catalyst has been found to be best suited for the purposes of the invention in its application to the reactivation of catalysts deactivated by exposure to frequent cracking and regeneration cycles.

The treatment of these catalysts in accordance with the invention consists essentially in subjecting the catalyst to the influence of anhydrous or aqueous hydrogen fluoride until an amount of about 0.1–5% of HF has been incorporated and, thereafter, heating the dry material in an oven or partially closed tube in the absence of steam at about 1050°–1150° F. for about 1–7 days, preferably about 2–4 days. When aqueous HF is to be used, the catalyst particles having a size of about 10–200 microns may be soaked at room temperature (50°–80° F.) in aqueous HF solutions of about 0.5–10% concentration for about 1–24 hours, depending on the desired HF concentration of the catalyst. The treatment with anhydrous HF may be effected by passing HF gas at about 500°–1000° F. over the subdivided catalyst particles for about 1–10 minutes to incorporate about 0.1–5 wt. percent of HF.

In the course of the research work which has led to the present invention it has also been found that the treatment in accordance with the invention may be used substantially to increase the selectivity of fresh or deactivated cracking catalysts which are contaminated with $Na_2O$. It is well known in the art of catalytic cracking that catalysts containing as little as 0.5% $Na_2O$ produce large quantities of undesirable gas. For example, a normal silica alumina catalyst of low soda content (about 0.05–0.4%) produces 4–6% hydrogen in the product gases whereas a similar catalyst containing about 0.5–1% of $Na_2O$ will produce about 25–30% $H_2$. The substantially complete removal of any $Na_2O$ introduced in the course of the preparation of the catalyst has, therefore, been considered an indispensable step in the preparation of cracking catalysts. A thorough washing treatment is required for this purpose whereby the cost of the catalyst is appreciably increased.

In accordance with the present invention, the selectivity of a cracking catalyst relatively rich in $Na_2O$ may be raised to and above the selectivity level of conventional low-soda cracking catalysts by a simple treatment with anhydrous or aqueous HF so as to incorporate about 0.1–5%, preferably about 0.3–0.7% of HF into the catalyst followed by heat-soaking at 1050°–1150° F. for at least 24 hours in the absence of steam. In this manner, catalysts which, in the course of their preparation or use, have picked up as much as 0.5% or more $Na_2O$ may be made highly efficient cracking catalysts. The treatment with HF may be carried out in a manner similar to that described above.

The following specific examples illustrate the beneficial effects of the present invention.

EXAMPLE I

A conventional gel-type silica-alumina cracking catalyst containing about 13% of alumina and having an average particle size of about 50–80 microns was used, to the extent that it had an average age of 90 days, in a conventional fluid-type cracking plant of commercial size wherein it was continuously circulated between a cracking zone maintained at about 925° F. and a combustion regeneration zone maintained at about 1100° F. A sample of this "equilibrium" catalyst was withdrawn from the unit; it contained about 0.5 wt. percent of carbonaceous deposits.

One portion of this sample was subjected to the standard cracking test described above to determine its $D+L$, CPF and GPF. A second portion of the sample was fluidized with a mixture of 10% HF and 90% by volume of nitrogen at 955° F. for about 2 minutes to an HF content on catalyst of 0.64%. The treated material was then pilled to $\frac{3}{16}''$ size. The catalyst so treated was tested like the first portion of the sample. A third portion of the sample was treated with HF as described for the second portion and thereafter heated in a closed tube provided with a pinhole vent in the absence of steam at 1100° F. for 7 days. Thereafter the catalyst was tested as above. The results of these 3 tests are summarized in Table I below.

Table I

| Pretreatment | Cracking Test Results | | |
|---|---|---|---|
| | Percent $D+L$ | CPF | GPF |
| None | 23 | 1.96 | 2.03 |
| 0.64 HF added | 30 | 1.67 | 2.00 |
| 0.64 HF added followed by heat treatment of 7 days at 1,100° F | 32 | 0.88 | 1.06 |

It will be noted from the above data that the selectivity improvements afforded by the treatment in accordance with the present invention, as measured by CPF and GPF, is significantly better than that obtained by HF treating alone.

EXAMPLE II

The beneficial effects of carrying out the heat-soaking step of the invention in a partially closed vessel, i. e. in a vessel connected with the atmosphere merely by a pinhole vent will now be illustrated by further experiments in comparison with results obtained by heat-soaking in an open pan at otherwise equal conditions. In these experiments a used silica-alumina cracking catalyst similar to that described in Example I with respect to particle size, carbon content and age, but of slightly better quality, was treated with aqueous HF to absorb about 0.6 wt. percent of HF as follows.

1500 grams of the used catalyst, 13% $Al_2O_3$—$SiO_2$, contained in a hard rubber bucket, was impregnated with 750 cc. distilled water solution of 10 grams HF (for this purpose 99 grams of a 10–13% aqueous HF solution was diluted to 750 cc. volume with distilled water). The solution and catalyst were mixed well with a hard rubber spatula for 5 minutes. All solution was adsorbed by the catalyst. The mixture was transferred to an aluminum tray and after drying in air at room temperature for 6 hours was transferred to an electric oven and further dried at 260° F. for 16 hours. The dried catalyst had a fluorine content of 0.6% (calculated as HF). Various samples of the catalyst so treated were heat-soaked and then tested as above described at the conditions and with the results summarized in Table II below.

Table II

| HF Treatment | Heat-Treatment Before Activity Test | $D+L$ | CPF | GPF |
|---|---|---|---|---|
| 0.6% HF | None | 33.5 | 1.21 | 1.12 |
| 0.6% HF | Pills heated 24 Hours, 1,100° F.—open pan. | 31.0 | 1.07 | 1.20 |
| 0.6% HF | Pills heated 72 Hours, 1,100° F.—open pan. | 30.5 | 0.94 | 1.23 |
| 0.6% HF | Pills heated 24 Hours, 1,100 F.—closed vessel with pinhole vent. | 30.0 | 0.85 | 0.97 |
| 0.6% HF | Pills heated 72 Hours, 1,100° F.—closed vessel with pinhole vent. | 30.0 | 0.69 | 0.95 |
| 0.6% HF | Pills heated 7 days, 1,100° F.—closed vessel with pinhole vent. | 30.5 | 0.66 | 0.95 |

The above data show that a considerably greater reduction in CPF and GPF, i. e. a considerably greater improvement in gasoline selectivity was accomplished at all heating times employed when heat-soaking was carried out in a closed vessel. In addition, it is evident that the effect of heat-soaking approaches a maximum after a soaking time of about 3 days, further heat-soaking for a total of 7 days affording merely a minor additional improvement.

EXAMPLE III

A silica gel alumina cracking catalyst containing about 13% alumina and about 0.06% $Na_2O$ was compared with a catalyst of identical composition except for a higher $Na_2O$ content which amounted to about 1%. Both catalysts had been used for about 2000 hours in a conventional fluid-type catalytic cracking plant involving continuous regeneration by coke combustion. These catalysts were tested for their CPF and GPF as described above, prior to and after the incorporation of 0.6% of HF and after heat-soaking in accordance with the invention as described in Example I. The results of these tests are tabulated below.

Table III

| Used Catalyst | $SiO_2$—$Al_2O_3$, 0.06% $Na_2O$ | $SiO_2$—$Al_2O_3$, 1% $Na_2O$ |
|---|---|---|
| Untreated: | | |
| GPF | 1.37 | 2.73 |
| CPF | 1.42 | 1.96 |
| $D+L$ | 29.0 | 22.0 |
| Treated with 0.6% HF: | | |
| GPF | 1.28 | [1] 2.00 |
| CPF | 1.24 | [1] 1.67 |
| $D+L$ | 35.0 | [1] 30.0 |
| Treated with 0.6% HF and heated 7 days at 1,100° F.: | | |
| GPF | 1.03 | [1] 1.06 |
| CPF | 0.94 | [1] 0.88 |
| $D+L$ | 34.5 | [1] 32.0 |

[1] Decarbonized at 1,000° F. prior to HF-treat.

EXAMPLE IV

Two used silica alumina catalysts of the type described in Example III but of intermediate Na₂O content were compared for their selectivity after incorporation of about 0.6% HF and after such HF treatment followed by heat-soaking for about 24 hours substantially in the manner described in Example I. The results of these tests are summarized in Table IV below.

Table IV

| Used Catalyst | $SiO_2$—$Al_2O_3$, 0.4% $Na_2O$ | $SiO_2$—$Al_2O_3$, 0.85% $Na_2O$ |
|---|---|---|
| Untreated: | | |
| GPF | 1.57 | 1.97 |
| CPF | 1.30 | 1.64 |
| D+L | 26.0 | 24.0 |
| Treated with 0.6% HF: | | |
| GPF | 1.24 | 1.34 |
| CPF | 1.02 | 1.09 |
| D+L | 33.0 | 34.0 |
| Treated with 0.6% HF and heated 24 hours at 1,100° F.: | | |
| GPF | 1.18 | 1.13 |
| CPF | 0.93 | 0.83 |
| D+L | 32.0 | 34.0 |

The above data demonstrate that the selectivity of high-soda cracking catalysts treated in accordance with the invention compare very favorably with that of a conventional low-soda cracking catalyst while greatly exceeding that of untreated soda catalysts. It is also evident that the percent improvement of selectivity upon heat-soaking of the HF-treated catalyst is substantially greater after soaking for several days as compared to soaking for 24 hours.

Fluid-type catalytic cracking has been repeatedly referred to above as one of the conventional systems for which the present invention is applicable. Actually, the invention finds its greatest utility in connection with fluid catalytic cracking which is inherently conducive to an accelerated rate of catalyst deactivation as a result of contamination with metals or metal compounds picked up from the equipment walls and feed stock by the rapidly circulating catalyst. A preferred modification of this embodiment of the invention will described below with reference to the accompanying drawing, the single figure of which is a flow plan of a system suitable to carry out an embodiment of the invention.

Referring now in detail to the drawing, hot regenerated powdered catalyst having an average particle size of about 50–80 microns is withdrawn from a regenerator 1 via a conventional standpipe 3, suspended in line 5 in the vaporized feed stock and passed into the lower portion of reactor 7 through suitable distributing means, such as grid 9. The velocity of the upflowing vapors in reactor 7 is such that the catalyst is maintained in a dense, turbulent, fluidized condition simulating a boiling liquid. Vapor velocities of about 0.5–3 ft. per second and bed densities of about 10–30 lbs. per cu. ft. are suitable for proper fluidization. Cracking conditions may include temperatures of 700°–1100° F. and pressures from atmospheric to about 25 p. s. i. g. Product vapors are withdrawn overhead through line 11. During the reaction, a coke-like deposit is formed on the catalyst particles. The catalyst particles so fouled are withdrawn from the fluidized mass via standpipe 13, stripped, suspended in air in line 15 and passed to regenerator 1 which is similar in design to reactor 7 so that a similar fluidized mass forms in the regenerator. The temperature in regenerator 1 is somewhat higher than the cracking temperature, say about 850°–1150° F. Coke-like deposits are burned in regenerator 1 and regenerated catalyst is returned from the dense bed to the oil charge and reactor as described above, preferably after suitable stripping.

A predetermined activity and selectivity of the catalyst is maintained by the periodic additions of more highly active and selective make-up catalyst. This may be accomplished in accordance with the invention as follows. An amount of deactivated catalyst equivalent to that to be added as make-up catalyst is withdrawn preferably from the regenerator side via line 17. The deactivated catalyst so withdrawn is suspended in a mixture of nitrogen or other inert gas with HF gas (0.1–5% HF content) from line 19 and introduced into a lower portion of treating vessel 21. The treating vessel 21 may be maintained at a temperature of 1000°–1100° F. and should be of such capacity as to permit a residence time of the catalyst in the vessel of 2–10 minutes. The velocity in vessel 21 may be such as to fluidize and take the catalyst overhead through line 23 and into vessel 25. Gas velocities in vessel 21 of about 1–5 ft. per second are suitable for this type of operation. The gas entering vessel 25 is vented via a gas-solids separator, such as cyclone 28, which prevents loss of solids from vessel 25 during this stage. When a sufficient quantity of catalyst has been accumulated in vessel 25 the gas and solids flow to vessel 21 is stopped. However, vessel 25 is aerated at all times to prevent packing of the catalyst. Bleed gas, such as nitrogen, inert gas ($N_2$+CO+$CO_2$), or dry air may be introduced for this purpose through lines 31. It is not contemplated to fluidize the catalyst in vessel 25 similarly as in vessels 1 and 7; the catalyst is merely maintained in a free flowing condition by the bleed gas in a manner similar to standpipe aeration. Only a small amount of extraneous gas may be used for this purpose with the effect that the heat-soaking is conducted in essentially a closed vessel, the only outlet being cyclone 28. This distinguishes the operation from an open vessel such as a tray.

When sufficient catalyst is collected in vessel 25 a temperature of 1100° F. is maintained in this vessel by a suitable flue gas heating jacket 29. The catalyst is kept at this temperature of 1100° F. in vessel 25 for at least 24 hours, preferably longer, and is then added back to the system as needed through conventional standpipe 27. Suitable rates of make-up catalyst may be about 0.5–3% of inventory per day depending on the relative quality of the deactivated and make-up catalysts. The operation of the soaker may be batch-wise so that sufficient catalyst is treated at one time to provide the make-up catalyst requirement for, say, 7 days. Two soakers 25 or a suitable storage hopper may be used to accomplish this purpose.

The foregoing description and exemplary operations have served to illustrate specific embodiments of the invention but are not intended to be limiting in scope.

What is claimed is:

1. In a process for the catalytic cracking of relatively high-boiling hydrocarbon oils to form motor fuel range hydrocarbons wherein a subdivided synthetic silica-alumina gel cracking catalyst containing about 0.5 to 1% of $Na_2O$ is circulated in a system comprising a cracking zone in which said hydrocarbon oils are cracked at a cracking temperature in contact with a dense, turbulent, fluidized mass of said catalyst resembling a boiling liquid with concomitant deposition of carbonaceous deposits on the catalyst and a catalyst regeneration zone in which the catalyst is regenerated at a regeneration temperature not below said cracking temperature by burning combustible deposits off said catalyst while in the form of a dense, turbulent, fluidized mass resembling a boiling liquid and wherein the selectivity of said catalyst toward the formation of motor fuels is reduced in the course of said process by effects other than said deposits, the improvement which comprises withdrawing a separate stream of catalyst of said reduced selectivity containing about 0.5 to 1% of $Na_2O$ from said regeneration zone, treating said withdrawn catalyst in the fluidized state in a treating zone with an inert gas containing 0.1 to 5% of hydrogen fluoride at a temperature of about 1000 to 1100° F. and for a time sufficient to incorporate about 0.3 to 0.7% of HF into the catalyst, passing catalyst so treated to a heat-soaking zone, heating said treated catalyst in said heat-soaking zone for about 2–7 days at a temperature of about 1050°–1150° F. in the absence of steam while excluding the surrounding atmosphere, and returning catalyst so heated to said system.

2. The process of claim 1 in which said catalyst is maintained in said soaking zone in a readily flowing state.

References Cited in the file of this patent

UNITED STATES PATENTS

| Number | Name | Date |
|---|---|---|
| 2,414,736 | Gray | Jan. 21, 1947 |

(Other references on following page)

UNITED STATES PATENTS

| Number | Name | Date |
|---|---|---|
| 2,430,724 | Meadow | Nov. 11, 1947 |
| 2,504,618 | Archibald et al. | Apr. 18, 1950 |
| 2,506,923 | Hoekstra | May 9, 1950 |
| 2,580,004 | Corneil | Dec. 25, 1951 |
| 2,651,599 | Watts et al. | Sept. 8, 1953 |

OTHER REFERENCES

"A Contribution to the Knowledge of Sodium Contamination on Cracking Catalyst," by Baker et al., Journal of Physical and Colloid Chem., vol. 52, Issue No. 8 (pages 1364–1372), November 1948.

"Acid Activation of Some Bentonite Clays," by Mills et al., Journal of Physical and Colloid Chem., vol. 54, Issue No. 8, pages 1170–1185, November 1950.